United States Patent [19]
Entrekin

[11] Patent Number: 5,484,522
[45] Date of Patent: Jan. 16, 1996

[54] AUTOMATIC OIL SPILL CONTAINMENT SYSTEM WITH THERMAL DISPERSION CONTROL

[76] Inventor: James L. Entrekin, 4511 Old Tavern Rd., Birmingham, Ala. 35242

[21] Appl. No.: 245,366

[22] Filed: May 16, 1994

[51] Int. Cl.⁶ .................................................. B01D 17/12
[52] U.S. Cl. .............................. 210/86; 137/392; 73/295; 210/112; 210/114; 210/149; 210/909; 374/141
[58] Field of Search .............................. 210/86, 149, 513, 210/909, 109, 112, 742, 114; 73/295; 208/262.11, 262.5; 137/172, 177, 187, 392; 374/43, 44, 141, 142

[56] References Cited

U.S. PATENT DOCUMENTS

| | | | |
|---|---|---|---|
| 2,573,172 | 10/1951 | Ennis | 137/68 |
| 3,279,380 | 10/1966 | Clark | 103/26 |
| 3,419,034 | 10/1968 | Hart | 137/172 |
| 3,882,967 | 5/1975 | Gulla | 184/103 |
| 4,539,109 | 9/1985 | Davis | 210/104 |
| 4,543,182 | 9/1985 | Gramse | 210/95 X |
| 4,596,266 | 6/1986 | Kinghorn | 137/192 |
| 4,781,826 | 11/1988 | Mendiratta et al. | 210/909 |
| 4,960,513 | 10/1990 | Young | 210/104 X |
| 4,967,593 | 11/1990 | McQueen | 210/86 |
| 4,974,626 | 12/1990 | Koch | 137/192 X |
| 5,082,012 | 1/1992 | Massey et al. | 210/909 |
| 5,178,754 | 1/1993 | Batten | 210/138 |
| 5,305,779 | 4/1994 | Izaguirre | 137/172 X |

FOREIGN PATENT DOCUMENTS

| | | | |
|---|---|---|---|
| 1644101 | 4/1991 | U.S.S.R. | 137/392 |
| 88/09918 | 12/1988 | WIPO | 73/295 |

*Primary Examiner*—Joseph W. Drodge

[57] ABSTRACT

A system for automatically preventing the discharge of spilled oil from electrical distribution substation equipment into streams or ground water. The system utilizes a containment basin, sump, electric operated water drain valve and a thermal dispersion type oil/water interface detector. The oil/water interface probe is placed at a specified height in the sump. It is capable of determining if the probe is in oil, water or air. The interface detector along with other relays will allow water to be draped from the containment basin but prevent oil from being discharged. The system will also initiate an alarm which may locally or remotely warn that a spill has occurred.

4 Claims, 3 Drawing Sheets

TOP VIEW

AUTOMATIC OIL SPILL CONTAINMENT SYSTEM WITH THERMAL DISPERSION CONTROL

BACKGROUND

1. Field of Invention

This invention relates to new and improved methods of protecting the environment from oil spills in electric power distribution and generating facilities, and the separation of oil from water by automatic means using newer technology for detecting oil/water interface.

2. Description of Prior Art

Electric power distribution substations are located in or near every populated area. Many of these substations are located near streams or other bodies of water. They can also be located near underground water supplies which are tapped by water wells for household or other consumption.

The problem lies in that the electrical devices located in these substations (transformers, circuit breakers, load tap changers and regulators) contain dielectric insulating oils in large quantities. Many of these oils also contain PCB's, which are a major health hazard. These devices are subject to conditions under which the oil contained in them may be leaked into the surrounding environment. Overheating or lightning strikes can cause fires and subsequent rupture of the oil containing vessel spilling hundreds or thousands of gallons of oil. Vandalism with the use of firearms also may result in spills with projectiles penetrating the vessel walls. Oil drain valves on the vessels themselves can also leak or be accidentally left open.

Some power companies have built concrete containment basins around the oil containing equipment in some of their substations in an effort to contain spills. There is still a problem however, because the basins can fill up with rainwater leaving too little room for the volume of oil that could be spilled. A spill occurring with water in the basin, or a heavy rainfall after a spill would result in oil overflowing the walls of the containment basin. Some companies included a manually operated drain valve by which the basin could be emptied of water, but this requires constant checking by company personnel. This is not feasible due to the large number of these substations and their sometimes remote locations. In this age of corporate downsizing and reduced numbers of personnel, many of these substations are electronically operated from remote centralized control facilities and are rarely visited for inspection. The manual water drain valve is also subject to accidentally being left open, allowing not only water but any oil present to escape. In addition, the operating company has no way of knowing that a spill has occurred unless an inspection is made or equipment going out of order alerts them to a problem.

Many of these same problems exist at the electric power generating facilities themselves, and sometimes to a greater extent. These facilities ( hydroelectric generating plants, coal and oil fired power plants, nuclear power plants and gas turbine electric generating plants) are by their nature located on or adjacent to bodies of water. They contain the same electrical devices mentioned above except larger and containing more oil. They also have many other sources of potential spills such as reservoirs of turbine generator lubricating oil, hydraulic oil, and in the case of gas turbine generating plants, tanks containing one million or more gallons of diesel fuel oil.

Prior art has described methods of dealing with these problems at the electric generating plants using capacitance sensors to detect an oil/water interface and thereby automatically drain water or water and oil into a collection sump by opening a solenoid valve in the basin. The water or water and oil is then pumped or drained by gravity into a second sump which collects liquids from the entire facility. There a system of float switches and a capacitance sensor attempt to keep water pumped out of the sump and into the adjacent body of water while stopping short of pumping any oil into the same. This system is more completely described in U.S. Pat. No. 5,305,779 to Izaguirre, Apr. 26, 1994. Other methods of separating oil and water are also described in other art which will be disclosed along with the aforementioned patent as a part of this application process. No prior art was found to make claims on an automatic system for releasing water but retaining oil in the containment basin around the electrical devices themselves and no reference is made to distribution substations remote from the power generating facility.

The prior art uses interconnecting piping, valves and pumps to collect water and spilled oil from several sources into a holding sump and then a second collection sump. Pumps are rotating devices which are subject to wear and electrical failure. If a pump fails due to wear, breakage or corrosion, or if the situation which causes the oil spill also knocks out electrical power to the pumps, the system can fail and overflow oil into the surrounding environment. Solenoid valves used in the past have small orifices and tortuous paths within them which are subject to clogging with debris causing malfunction of the drainage system and overflow of oil.

Existing systems require multiple sensors for detecting oil/water interface and controlling water discharge while retaining oil. They also require AC electrical power which may be lost when one of the aforementioned events occur which cause a spill. Other systems have not addressed the need for a means of alarming when a spill occurs at a substation at the generating plant or at a remote location. The existing inventions do not address the possibility of oil entering the containment basin first, filling the water drain pipe with oil which is then released when water enters the basin and automatic controls open the water drain valve. Other methods of separating oil from water require heat which is expensive, or rely on predicted amounts of water to be drained over a period of time which could change. Although other separation methods use electrical sensors they require the use of extraneous electronic logic computation systems. Perhaps of greatest importance is the fact that newer, simpler and less expensive devices for detecting and controlling oil/water interface are now in existence.

OBJECTS and ADVANTAGES

Accordingly, several objects and advantages of my invention are:

To provide a new, novel and improved system, method and equipment for preventing the discharge of oil into the environment due to spills from equipment in electric power substations and generating plants, and to automatically drain accumulated water from the containment area.

To provide a system, method and equipment that is more simple, more economical and more reliable.

To provide a new and improved method and devices for detecting oil/water interface.

To provide local and remote alarm capability to warn of an environmental hazard due to spillage of oil.

In addition and more specifically this new invention will accomplish the above with a novel system and method as follows:

For Automatic Containment Basin Systems

It will incorporate the use of a newer and different device for the detection and control of oil/water interfaces which operates on the principle of thermal dispersion in materials with differing specific heats.

This new interface control requires only one probe or sensor and requires no additional logic other than that which is self-contained to accomplish the task.

The system will completely automate the oil discharge prevention and water drainage system at remote substations and require only periodic inspection. It will automatically drain accumulated water, leaving sufficient capacity for and retaining any spilled oil in the containment basin. In addition, an alarm capability is added to give indication locally or at a central control location that a spill has occurred. This will be discussed in further detail later. The water drain valve will be fully automatic and not subject to improper closing or accidentally being left open.

An electric operated, full ported ball valve will be the preferred equipment for the water drain valve and will offer many advantages as opposed to a solenoid valve. This valve has an opening which is the same diameter as the connecting pipe with no obstructions in the flow path to trap debris. It also features a straight through flow path with no small orifices and no turns which may clog with debris as does a solenoid valve.

This invention operates on DC electric power which is already available at many substations even during power outages with the use of battery back-up control power systems. This would allow the system to operate at any time it is needed to close the valve to prevent oil from being discharged through the piping or to open the valve and release water to prevent oil from overflowing the containment basin walls. It is also a low power solid state system and the valve only uses power when it is called upon to change positions. The system is also available for AC power operation.

The problem of oil being trapped in the water discharge piping and subsequently discharged to the environment is solved with a special and novel piping arrangement.

Another unique feature of the system is that it can differentiate between oil and air and when connected with unique electric circuitry utilized thereby avoid any false alarms when the interface probe is uncovered due to drainage through the valve or evaporation of the water.

A unique feature of this invention is that it relies on gravity drainage of water from the containment basin and requires no pumps. This gives added assurance that the system will not overfill and discharge oil into the environment due to failure of pumps because of wear, mechanical breakage, electric motor failure or corrosion of parts.

This system does not deliberately introduce oil into a piping system which is subject to leakage at joints, fittings, valves and pumps.

This invention accomplishes the separation of oil and water without the means of heat, or electrical energy other than that required to operate the interface detector and the valve.

For Automatic Collection Sump Discharge Systems

This invention may also improve the existing automatic systems for draining building sumps containing oil and water by utilizing the newer thermal dispersion interface detector technology. A thermal dispersion interface detector could be used in place of a capacitance switch. Other thermal dispersion detectors could replace floats which are mechanical devices which are subject to wear, breakage and corrosion.

Reference Numerical Listing

Figure 1:
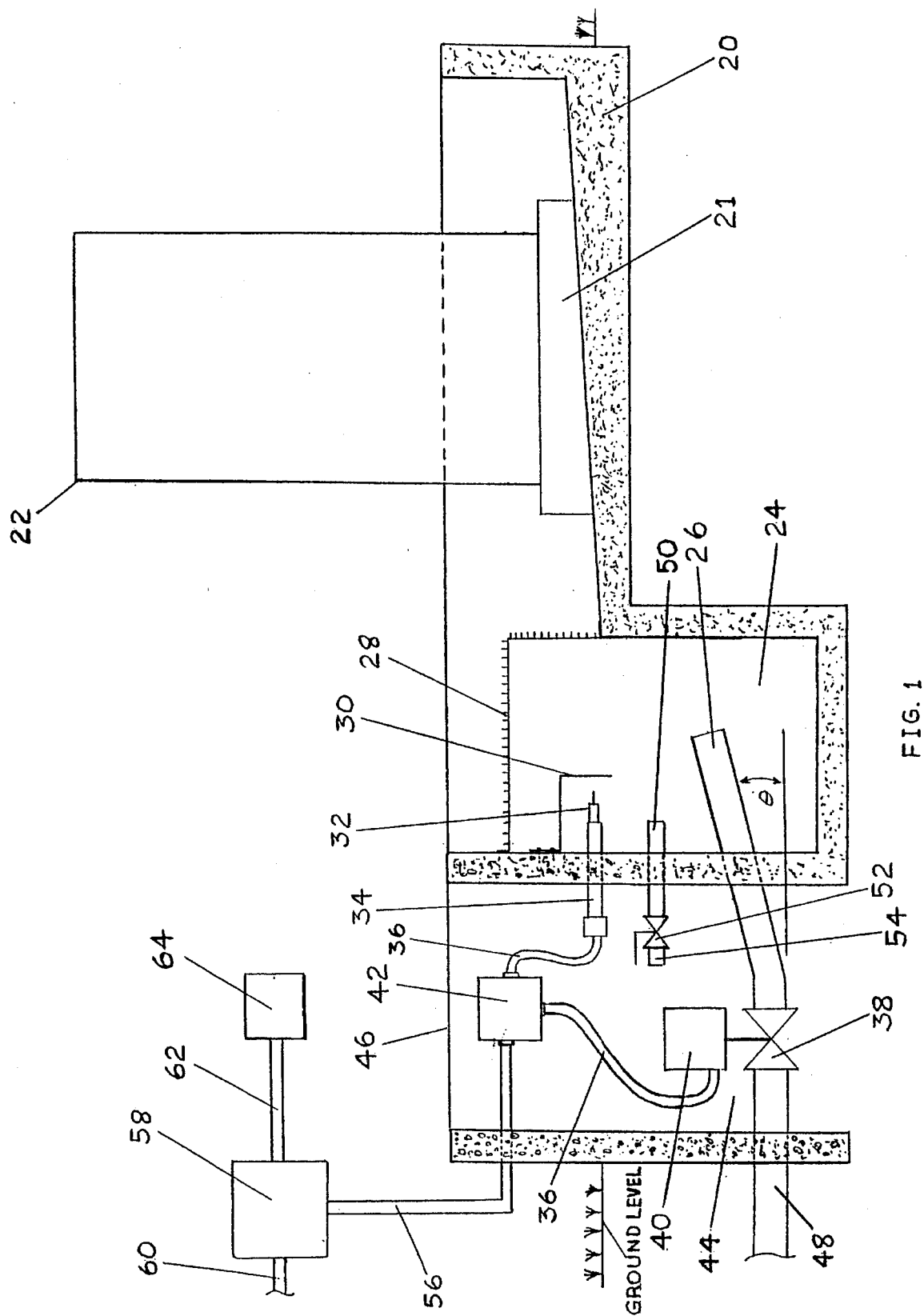
FIG. 1. is a side section view of the invention which shows the method of containment and collection of oil and or water and the location of the important features and equipment.
Figure 2:
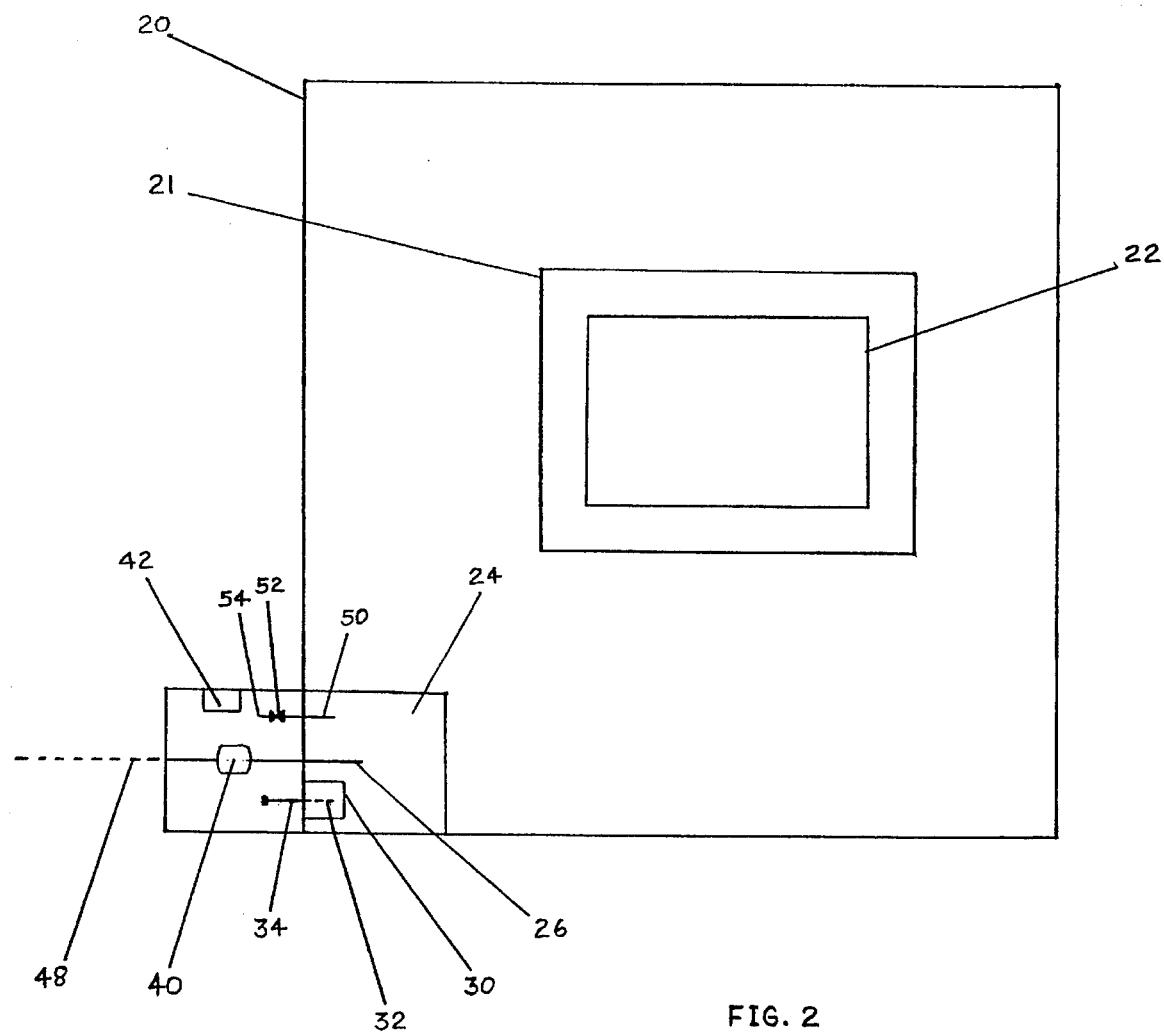
FIG. 2. is a top view of FIG. 1. in line form only to give the location and relative size of containment basin features and the other equipment.
Figure 3:
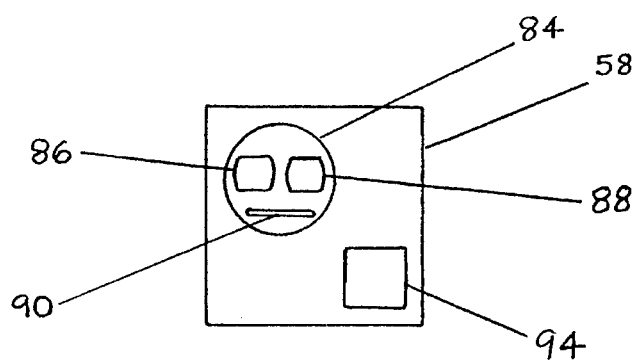
FIG. 3. is an inside view of the control box.
Figure 4:
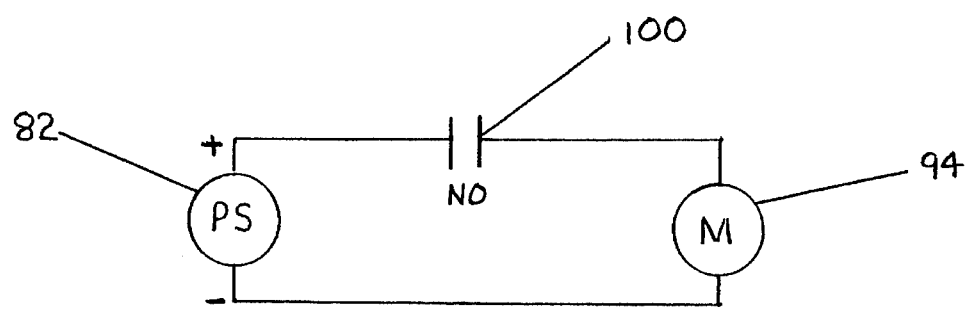
FIG. 4. is an electrical schematic for the operation of the valve motor relay.
Figure 5:
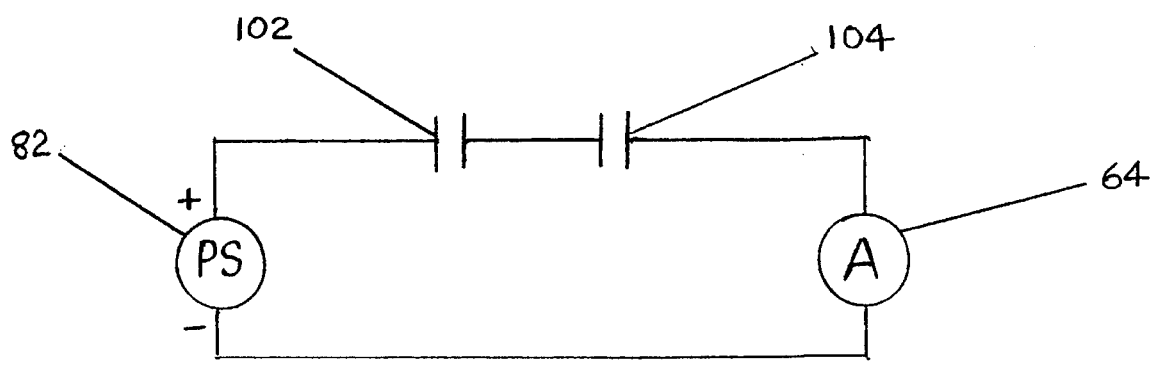
FIG. 5. is an electrical schematic for the alarm system.

FIG. 1.- Side View
20 - concrete containment basin
21 - apparatus mounting pad
22 - transformer or other oil containing apparatus
24 - sump
26 - inlet water drain pipe
28 - grate
30 - probe shield/baffle
32 - interface probe
34 - rigid conduit/support for interface probe
36a - flexible conduit
36b - flexible conduit
38 - water drain valve
40 - electric valve actuator
42 - electrical junction box
44 - valve pit
46 - valve pit cover
48 - outlet water drain pipe
50 - oil drain pipe (optional)
52 - manual oil drain valve, locked (optional)
54 - connection for portable oil drain pump (optional)
56 - electrical conduit to control box
58 - control box
60 - electrical power conduit
62 - alarm signal conduit
64 - alarm (local and/or remote)
FIG. 2. - Top View
20 - containment basin
21 - apparatus mounting pad
22 - transformer or other oil containing apparatus
24 - sump
26 - inlet water drain pipe
30 - probe shield/baffle
32 - interface probe
34 - rigid conduit/support for interface probe
40 - electric valve actuator
42 - electrical junction box
48 - outlet water drain pipe
50 - oil drain pipe (optional)
52 - manual oil drain valve, locked (optional)
54 - connection for portable oil drain pump (optional)
FIG. 3.
58 - control box
84 - interface control circuit board
86 - set point no. 1 relay 88 - set point no. 2 relay
90 - circuit board terminal block
94 - power relay for electric valve actuator
FIG. 4.
82 - power supply
94 - power relay
100 - normally open contacts/set point no. 1
FIG. 5.
64 - alarm (local and/or remote)
82 - power supply
102 - normally closed contacts/set point no.1
104 - normally closed contacts/set point no. 2

DESCRIPTION OF INVENTION

FIG. 1.

Side View

FIG. 1. shows a side view of the invention, in sectioned or cutaway mode. Item 20 is the concrete containment basin used to hold any oil spill. Item 21- is the apparatus mounting pad on which sets the transformer or other oil containing apparatus. Item 22 is the transformer or other oil containing apparatus. Item 24 is the sump in which the oil and/or water drain by means of the sloped floor of the basin and in which the interface probe and inlet water drain pipe are located.

Item 26 is the inlet water drain pipe which is mounted at an angle sloping upwards from left to right to facilitate the movement of oil out of the pipe as water level in the sump rises. This is to prevent inadvertent discharging of oil which could otherwise be trapped in the pipe and drained out along with water when the water drain valve opens. Item 28 is a grate which serves to protect the interface probe (32) and the inlet water drain pipe (26) from debris such as leaves, sticks or litter. Item 30 is the probe shield/baffle which serves to keep rain off the interface probe which might result in a false signal indicating the presence of water at the probe level. It also serves to deflect any possible rushing of water or oil onto the probe which could result in a false water signal.

Item 32 is the interface probe which is stainless steel and contains two RTD's. One RTD senses the ambient temperature and the other is heated and its value changes with the specific heat or thermal dispersion characteristics of the fluid surrounding it. In conjunction with its accompanying electronics it is able to easily differentiate between oil and water, oil and air or any other combination of substances with different thermal dispersion characteristics. The electronics are usually mounted remote from the probe for convenience. The electronic circuit board features two relays each with an adjustable set point, and a terminal where the power is connected and the relay contacts are wired for use in controlling the valve and alarm. This interface detector is commercially available.

Item 34 is a rigid conduit/support for the interface probe. It would normally be a section of pipe or conduit and serves to hold the probe (32) in place at the desired level where the oil/water interface is to be detected. This invention is not limited by the specific mounting arrangement shown. The interface probe can be located at the proper level by other means such as on a pipe or conduit which is mounted near the top of the basin wall, extending down into the sump from above. The electrical cable which interconnects the interface probe (32) and the interface control circuit board (item 84 in FIG. 3.) passes through 34 and item 36a (flexible conduit) to the electrical junction box (item 42). From there the cable passes through the electrical conduit (item 56) to the control box (item 58) and is there terminated on the Interface control circuit board (FIG. 3., item 84).

Item 60 is the electric power conduit which carries the power which operates the entire system to the control box (item 58). Item 62 is the alarm signal conduit which carries the alarm signal wiring from the control box (58) to the alarm (item 64). The alarm (64) can be either a locally mounted warning light or annunciator, or a remote alarm which is transmitted by wire or radio to the central control location.

Item 38 is the water drain valve. It is preferably a full port ball valve with appropriate seat materials for chemical resistance and tight sealing. It is operated by an electric valve actuator (item 40). The full port ball valve serves to drain the water from the containment basin and seal off oil from escaping. By nature the ball valve is bubble tight sealing. The straight through flow path has no obstructions, makes no turns and is of the same size and shape as the inside of the pipe. This is ideal because it is the least likely valve design to become clogged should any debris reach it. The electric valve actuator is powered through wiring in the flexible conduit (item 36b) which continues through the electrical junction box (42), the electrical conduit to control box (item 56), and terminates in the control box (item 58) on the power relay for electric valve actuator (item 94, FIG. 4.).

Item 48 is the outlet water drain pipe which is connected to the water drain valve. It is important to note that this pipe is sloped downgrade away from the basin so as to drain water passing through the water drain valve away by gravity to a nearby stream or other place suitable for the water to be discharged. Item 50 is an oil drain pipe which is optional. Item 52 is the manual oil drain vale which has a locking handle and is optional as is item 54, the connection for portable oil drain pump. The water drain valve (38) is located in the valve pit (item 44) and is protected from the elements by the valve pit cover (item 46) which is an optional item.

FIG. 2.

Top View

In FIG. 2., we again see the system, this time in line diagram form without as much detail. The purpose of this figure is to see the orientation of the features in the side view. Item 20 is the containment basin. Item 21 is the apparatus mounting pad. Item 22 is the transformer or other oil containing apparatus. Item 24 is the sump.

Item 26 is the Inlet water drain pipe, item 40 is the electric valve actuator, and item and item 48 is the outlet water drain pipe. Item 32 is the interface probe which is underneath the probe shield/baffle, item 30. Item 34 is the rigid conduit support for the interface probe.

Item 42 is the electrical junction box to which the electrical conduits 36a, 36b and 56 in FIG. 1 are connected. Item 50 is the oil drain pipe, item 52 the manual oil drain valve, and item 54 the connection for portable oil drain pump. Items 50, 52 and 54 are all optional and are not essential for the operation of the system.

FIG. 3.

FIG. 3 is an inside view of the equipment in the control box. The exact position of each item in the control box is not important. The purpose is to show what embodiments are necessary for operation of the system. Item 58 is the outline of the control box. Item 84 is the interface control dual set point circuit board, on which is located item 86- set point no. 1 relay, and item 88- set point no. 2 relay. Item 90 is the circuit board terminal block, and item 94 is the power relay for electric valve actuator.

FIG. 4.

FIG. 4 is an electrical line schematic showing the operation of item 94, the power relay for electric valve actuator. Item 82 is the power supply, preferably 24 volts DC for fail-safe operation of the system at all times. Item 100 is the normally open contact/set point no.1.

FIG. 5.

FIG. 5 is an electrical line schematic showing the electrical connections for operating the alarm. Again we see item 82, the power supply, connected to the alarm (item 64) through both item 102, the normally closed contact/set point no. 1 and item 104, the normally closed contact/set point no. 2.

OPERATION OF INVENTION

FIGS. 1–5

FIGS. 1 and 2 show a gravity containment basin (20) which is constructed around the transformer or other oil containing apparatus (22). The containment basin is custom designed to hold the oil volume contained in 22, plus additional capacity dependent on the maximum expected rainfall for the area if outdoors and any fire protection water volume.

The containment basin has a sloping floor which drains the entire area basin toward a sump 24., which is located in one corner of the basin. This allows all rainwater, spilled oil, or water from other sources to be collected in the sump. The sump is covered by a grate 28 to prevent debris such as sticks, leaves or litter from entering the sump and posing a possible clogging problem of the water drain system. The containment basin shown is constructed of concrete but other alternate materials are possible. The sump is large enough to accept a large inlet water drain pipe 26 and the interface probe 32, both of which protrude through the concrete wall of the sump into the adjacent valve pit 44.

As rainwater fills the sump the level rises above the inlet water drain pipe 26 which is sloped upward from left to right as shown. This allows any oil which was previously in the sump to float out of 26 and onto the top of the water, due to the lower specific gravity of the oil. Approximately 2 inches above the top of 26 is the interface probe 32. It should be located near but just below the top of the sump. This will allow the control system to keep the basin drained of water except that which is below the interface probe 32. When water covers the interface probe 32 set point relay no. 1 (86) is energized, closing normally open contact/set point no.1 (100) and energizing the power relay for electric valve actuator (94). This sequence applies power to 40, the electric valve actuator and opens the water drain valve 38, allowing water to drain by gravity through the outlet water drain pipe 48.

As the level in the sump drops below the interface probe and it comes into contact with oil or air, its set point is adjusted to de-energize set point relay no. 1 (86), reopening normally open contact/set point no. 1 (100) and de-energizing power relay for electric valve actuator (94). This action then applies power to 94 for closing of the valve 38, preventing water or oil from escaping.

Should an oil spill occur, the oil would float on top of any water in the basin and sump. As water is drained out, the interface control circuit board will de-energize set point relay no. I as soon as the oil comes into contact with the interface probe, closing the valve and preventing any further drainage.

Normally water will stay above the top of the inlet water drain pipe 26 unless evaporation takes the level lower. If an oil spill occurred under this condition, oil will fill the sump and also the inlet water drain pipe. The water drain valve will not open until the interface probe comes into contact with water again. Should water begin to enter the sump at this time, it will seek the lowest level and begin to fill the sump pushing the oil/water interface up above the interface probe. It is important to note the novel feature of the inclined angle of the water inlet pipe. As the oil/water interface rises, oil which would have filled the inlet water drain pipe floats out of the pipe and onto the surface of the water. When the water drain valve reopens the oil is floating on top of the water and not discharged.

An alarm function is possible with the system using the normally closed contacts/set point no. 1 (102) to initiate a possible alarm. Since the set point no. 1 relay is de energized when the probe in oil or air, a false alarm is prevented by placing normally closed contact/set point no. 2 (104) in the circuit to allow the alarm signal to pass. Set point no. 2 relay (88) is set to de-energize when the probe is in contact with oil or water and energize only when the probe in surrounded by air. Therefore if the probe is in air, the alarm signal will be prevented from reaching the alarm.

It should also be noted that relay 86 is energized only when the probe 32 is in contact with water and de-energized in oil or air. Relay 88 is energized only in air and de-energized when 32 is in oil or water. This makes the system fail safe so that upon loss of power or electrical malfunction, the valve will always be directed to close and the alarm assume that an oil spill has occurred.

Conclusion, Ramifications and Scope of Invention

Thus the reader will see that the above system and method is a relatively simple, reliable and inexpensive method and means for protecting the environment from oil spills from electrical equipment in electric power substations.

While the above description contains many specifics, these should not be construed as limitations on the scope of the invention, but rather as an exemplification of one preferred embodiment thereof. Many other variations are possible.

For example, the invention can also be applied at any place where oil containing equipment is stored or worked on, not just electrical equipment. The thermal dispersion oil/water interface detector can be used in prior art systems to replace capacitance switches and floats. The system does not necessarily have to be gravity drained but could utilize pumps to evacuate the water as well as the oil, automatically or manually. Sumps could be replaced by above ground tanks. Materials of construction could be different. A different type valve could be used or an electrically switched air operated valve actuator could replace the electric motor operated valve actuator. Sizes and shapes of the containment basin, sump, valve and piping can change as needed or desired.

Of great importance is the fact that the interface probe can be placed in different positions and mounted by different means than shown here. This invention also implies that it is not just an oil/water separation system but will work anywhere two non miscible fluids of differing specific gravity need to be separated. It need not be used for accidents only but also for any deliberate fluid separation system.

Accordingly, the scope of the invention should be determined not by the embodiments illustrated, but by the appended claims and their legal equivalents.

I claim:

1. An automatic oil spill containment and water discharge system whereby oil is captured, and accumulated water is released, including, in combination:
   a) a means for capturing spilled oil and water in a containment basin having an inlet water drain pipe and a sump and creating an interface between said oil and water;
   b) a means for detecting the presence and location of said interface with a thermal dispersion interface control, having an interface probe portion of said control located at a predetermined level in the sump of said containment basin;
   c) a piping means and said interface probe portion both being placed in relation to the inlet water drain pipe such that water may be drained from said containment basin without discharging any oil; and
   d) a means for automatic fail safe controlling of a water drain valve, responsive to said means for detecting, and, connected to said inlet water drain pipe such that water is discharged and oil is retained in said containment basin.

2. The system, described in claim 1 wherein said means for detecting includes:
   a) a single interface probe located at a predetermined level in said sump and
   b) an interface control circuit board portion connected to said interface probe via a shielded electric cable, the interface control circuit board portion thus being able to distinguish between the presence of oil, water and air surrounding the interface probe due to the effect of the thermal dispersion properties of these fluids on two RTD's located in said interface probe, the circuit board portion operably connected to set point relays so as to control said water drain valve and an alarm.

3. The system described in claim 2 wherein:
   a) said drain pipe penetrates a wall of said sump at a predetermined angle sloping downwardly from the inside of said sump through said wall to the outside of the sump such that liquid entering the drain pipe flows by gravity through the drain pipe, valve and an outlet water drain pipe also included in said system, said outlet drain pipe being sloped at a downward angle such that any liquid in the outlet water drain pipe will flow by gravity away from the sump and containment basin;
   b) said interface probe being approximately 2 inches above the opening of said inlet drain pipe in order to detect the presence of the interface before it reaches the inlet drain pipe and
   c) said valve being a ball valve, connected between said inlet drain pipe and said outlet drain pipe, and operable to be opened and closed by an electric valve actuator or electrically switched valve actuator in order to allow water to pass through to the outlet drain pipe when open or to prevent oil from being discharged when closed.

4. The system described in claim 3 further including:
   a) a DC battery power supply which operates the interface control and said electric or electrically switched valve actuator, preventing a malfunction due to loss of power;
   b) a set point number one relay and a set point number two relay on the circuit board portion;
   c) normally open contacts coupled to the number one relay which are in series with a power relay across DC voltage, said power relay closing said drain valve by applying closing DC power to said electric or electrically switched valve actuator when oil or air surrounds said interface probe thus de-energizing the number one relay and opening contacts, said power relay opening said drain valve by applying opening DC power to said electric or electrically switched valve actuator when water surrounds said interface probe thus energizing the number one relay and closing said contacts and
   d) normally closed contacts coupled to the number one relay and normally closed contacts coupled to the number two relay together connected in series with said alarm across DC power such that when said interface probe is surrounded by oil both the number one and number two relays are de-energized and DC power is applied to said alarm, when the interface probe is surrounded by water the number one relay is energized blocking DC power to the alarm and when air surrounds the interface probe the number two relay is energized blocking DC power to the alarm.

\* \* \* \* \*